Nov. 2, 1948.      G. D. CALLOWAY      2,452,993
SCREW PIVOT FOR SHEARS
Filed Oct. 23, 1944
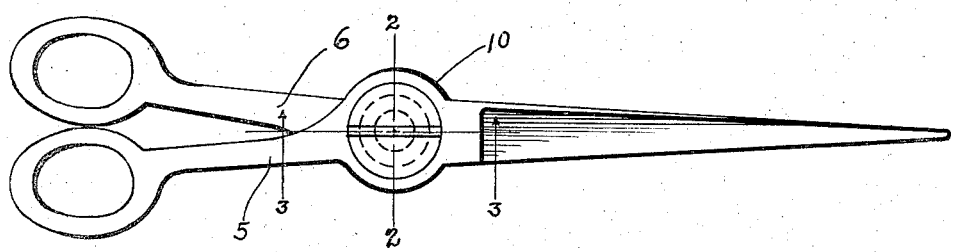
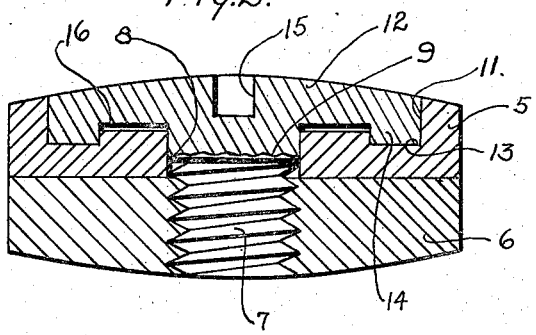
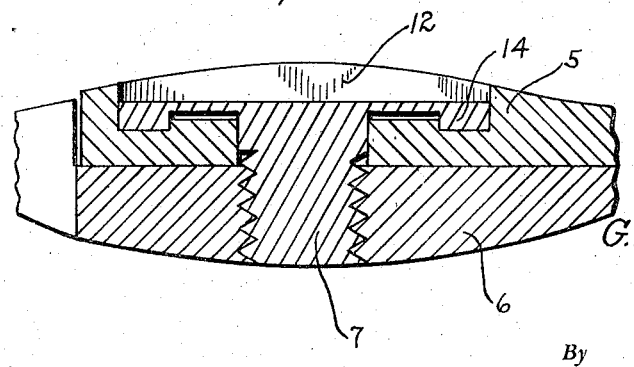
Inventor
G. DEWITT CALLOWAY,
By *Clarence A. O'Brien*
and *Harvey B. Jacobson*
Attorneys Patented Nov. 2, 1948

2,452,993

UNITED STATES PATENT OFFICE 2,452,993

SCREW PIVOT FOR SHEARS

Gaither Dewitt Calloway, Elkin, N. C.

Application October 23, 1944, Serial No. 559,936

1 Claim. (Cl. 30—266)

The present invention relates to new and useful improvements in shears and more particularly to the screw pivot employed for fastening the blades of the scissors or shears in cutting relation.

An important object of the present invention is to provide means for pivotally connecting the blades of the shears in a manner to eliminate looseness or play between the blades which interferes with the effective cutting action thereof.

A further object is to provide a device of this character of simple and practical construction which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the shears embodying the present invention.

Figure 2 is a transverse sectional view taken substantially on a line 2—2 of Figure 1, and Figure 3 is a fragmentary cross-section taken on the line 3—3 of Figure 1.

Referring now to the drawings in detail, wherein for the purpose of illustration I have disclosed a preferred embodiment of the invention, the numeral 5 designates the upper blade of the shears and the numeral 6 designates the lower blade thereof.

The blades are pivotally connected by means of a screw 7 which is threaded into the lower blade, while the upper blade is formed with a smooth bore 8 in which is freely rotatable the smooth inner end portion 9 of the shank of the screw, the pivotal action of the blade thus preventing loosening of the screw.

At the point of pivotal connection of the blades the same are enlarged as shown at 10, the enlargement projecting laterally at each side of the blades to thus provide an enlarged countersunk portion 11 in the outer surface of the upper blade 5 to accommodate the enlarged head 12 of the screw for positioning flush with the outer surface of the blade.

The base of the countersunk portion 11, adjacent the outer edge of the latter, is formed with an annular groove 13 in which an annular rib 14 is snugly and conformably fitted, the rib being formed on the underside of the head 12 of the screw at the peripheral edge thereof.

The outer surface of the head 12 of the screw may be formed with the usual kerf 15 to accommodate a screwdriver as shown in Figures 2 and 3 of the drawings, or the head may be plain.

As will be apparent from an inspection of Figures 2 and 3 of the drawings, the rib 14 exerts a downward pressure on the upper blade 5 when the screw is tightened, while the portion of the head of the screw inwardly of the rib is spaced from the blade as indicated at 16. Accordingly through the provision of the enlargement 10 at the pivot point of the blade and the provision of the enlarged head 12 on the screw a relatively wide bearing surface between the blade 5 and the head of the screw is provided so that play between the blade 5 and the head of the screw is substantially eliminated and looseness between the cutting edges of the blade is accordingly avoided and the cutting edges of the blade are, therefore, held in firm cutting relation throughout the entire length of the blade. By reason of this construction a more effective cutting action is accomplished.

It is believed that the details of construction and manner of use of the device will be readily understood from the foregoing without further detailed explanation.

Having thus described the invention, what is claimed is:

Means for pivotally connecting a pair of cutting blades and comprising a screw threadedly engaged with one of the blades and free of the other of said blades, said last-named blade having a countersink therein and said screw having an enlarged head positioned in said countersink, said countersink having an annular groove therein at its outer edge and an annular rib formed on the underside of the head at the peripheral edge thereof conformably seated in said groove.

GAITHER DEWITT CALLOWAY.

REFERENCES CITED

The following references are of record in the file of this patent:

UNITED STATES PATENTS

| Number | Name | Date |
|---|---|---|
| 397,389 | Richards | Feb. 5, 1885 |
| 565,193 | Wheeler | Aug. 4, 1896 |
| 802,868 | Laude | Oct. 24, 1905 |
| 1,633,441 | Firth | June 21, 1927 |
| 1,862,079 | Gilstrap | June 7, 1932 |
| 1,966,044 | Place | July 10, 1934 |
| 2,076,041 | Payne | Apr. 6, 1937 |
| 2,088,224 | Aiken | July 27, 1937 |